United States Patent
Rauch et al.

[11] Patent Number: 5,096,132
[45] Date of Patent: Mar. 17, 1992

[54] SUPPORTING AND ADJUSTING DEVICE FOR COUNTERCUTTER RAIL OF FIELD CHOPPERS

[75] Inventors: Hans Rauch, Saulgau-Kleintissen; Siegfried Gernert, Bad Waldsee, both of Fed. Rep. of Germany

[73] Assignee: Claas Saulgau GmbH, Saulgau, Fed. Rep. of Germany

[21] Appl. No.: 529,906

[22] Filed: May 29, 1990

[30] Foreign Application Priority Data

Jun. 10, 1989 [DE] Fed. Rep. of Germany ....... 3919055

[51] Int. Cl.$^5$ ............................................. B02C 18/18
[52] U.S. Cl. .................................... 241/241; 241/287
[58] Field of Search .................. 56/12.1, 14.5; 241/222, 241/101.7, 233, 239, 240, 241, 286, 287, 289, 290; 83/349, 699

[56] References Cited

U.S. PATENT DOCUMENTS

| | | | |
|---|---|---|---|
| 3,750,510 | 8/1973 | Gabriels | 83/349 X |
| 3,995,783 | 12/1976 | Bertrand et al. | 241/239 X |
| 4,190,209 | 2/1980 | DeBuhr et al. | 241/241 X |
| 4,230,281 | 10/1980 | Hill et al. | 83/349 X |
| 4,436,248 | 3/1984 | Lindblom et al. | 241/241 X |
| 4,474,336 | 10/1984 | Fleming | 241/241 X |
| 4,678,130 | 7/1987 | Martenas | 241/241 X |

FOREIGN PATENT DOCUMENTS

| | | |
|---|---|---|
| 3302861 | 8/1983 | Fed. Rep. of Germany . |
| 1096394 | 6/1955 | France ................................ 241/241 |

Primary Examiner—Mark Rosenbaum
Attorney, Agent, or Firm—Michael J. Striker

[57] ABSTRACT

A supporting and adjusting device for a counter-cutter rail of a field chopper having a cutting element with a partially surrounding bottom, the device comprises a saddle arranged so that the countercutter rail can lie on the saddle, two levers supported outside a surface of the cutting element and adjusting a distance from the saddle to the outer surface of the cutting element, the saddle being fixedly connectable with the countercutter rail and adjustable about a stationary axis extending parallel to a circumference of the cutting elements so that the saddle together with the countercutter rail can be adjusted to be at different distances to the outer surface of the cutting element.

10 Claims, 1 Drawing Sheet

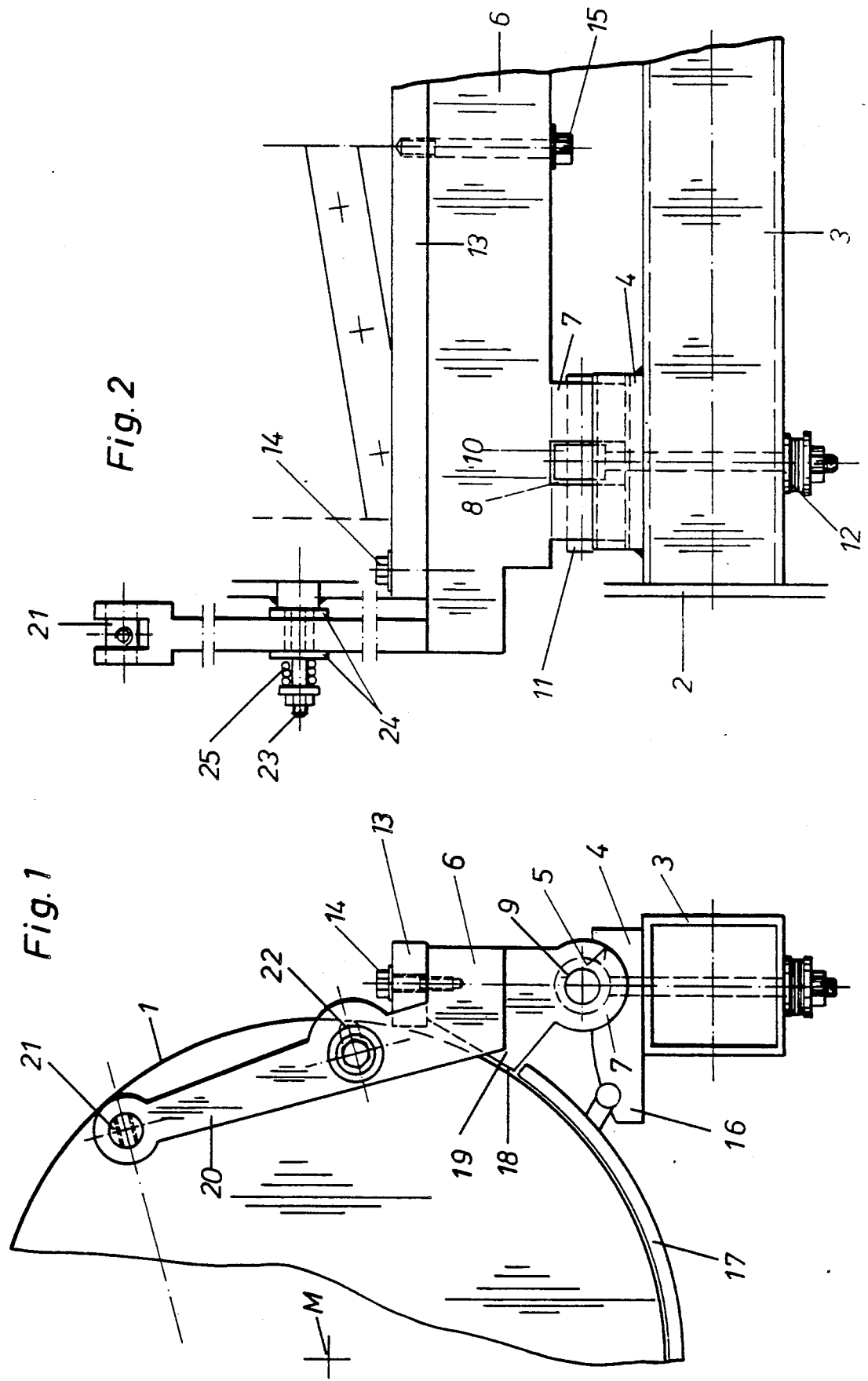

SUPPORTING AND ADJUSTING DEVICE FOR COUNTERCUTTER RAIL OF FIELD CHOPPERS

BACKGROUND OF THE INVENTION

The present invention relates to a supporting and adjusting device for countercutter rails of field choppers having a cutting element with a partially surrounding bottom, and a saddle which supports the countercutter rail and has an adjustable distance to the outer surface of the cutting element.

A supporting and adjusting device of the above mentioned general type is known in the art. In the field choppers of this type the countercutter rail must be mounted on a support in a non-displaceable manner during the operation to take up significant cutting forces, and at the same time must be simply actuatable from outside to adjust the countercutter rail.

German documents DE-PS 2,926,538 and DE-OS 3,302,861 disclose two different approaches to solve this problem. In both cases the field chopper has a cutter drum supported in a box with the side walls and a support fixedly mounted between the side walls for the countercutter rail supported thereon. They are fixed at their both ends and outside the side walls, and tensioned to a certain degree. The value of tensioning is limited by the fact that the countercutter rail must be displaceable for the adjustment. These approaches have the disadvantage in that the countercutter rail must be designed so as to withstand high forces so that it can take up spreading forces occurring during cutting without significant lasting deflection. Another difficulty is that the countercutter rail which loosely lies in the region of the cutter drum and is pretensioned only outwardly has a tendency to vibration under the action of the periodically acting cutting forces. This results in disadvantages for the holding strength and the cutting accuracy.

SUMMARY OF THE INVENTION

Accordingly, it is an object of the present invention to provide supporting and adjusting device for a countercutter rail of a field chopper, which avoids the disadvantages of the prior art.

In keeping with these objects and with others which will become apparent hereinafter, one feature of the present invention resides, briefly stated, in a supporting and adjusting device in which the countercutter rail is fixedly connected with a saddle which in turn is turnable about a horizontal axis and thereby by turning displacement can be adjusted to the outer surface of the cutter element. The device can be used both for the drum field chopper and the disc field chopper.

Further features of the present invention provide for an especially rigid and at the same time easily mountable connection. In accordance with one such feature the height of the saddle is significantly greater than the thickness of the countercutter rail. Further, the stationary transverse support can be provided with concave or convex supporting members having a circular-arc shape and rotatably supporting a circular-arc curved lower side of the saddle.

The turning axis for the saddle can be determined by a central line of a transverse opening extending through the saddle and receiving an axial pin. The axial pin can be connected with the transverse support by an eye-screw or a similar element so that the curved lower side of the saddle can be held against the curved supporting members of the transverse support.

The eye-screw or similar element can provide for a dosed adjustment of the lower side of the saddle against the curved supporting members of the transverse support through elastic intermediate elements or springs.

Additional features of the present invention provide for a low number of parts in the adjusting device. In particular, one or two ends of the saddle can be provided with an adjusting element for manual or power turning of the saddle about its transverse axis. The adjustment element can be connected on one end with the saddle and on the other end with a longitudinally displaceable pulling and pressing member supported on the frame.

The movement of the adjusting member can be limited by a friction brake so that the saddle together with the countercutter rail can be firmly retained in its position during the operation. The friction brake can be tightened or released by a hydraulic means.

Finally, a part of the bottom which surrounds the cutting element can be fixedly or pivotally connected with the saddle so that this part of the bottom also approaches the outer surface of the cutting element during displacement of the countercutter rail.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a device for supporting and adjusting a countercutter rail for a field chopper in accordance with the present invention from its side; and FIG. 2 is a front view of the device for supporting and adjusting the countercutter rail of the present invention.

DESCRIPTION OF A PREFERRED EMBODIMENT

A cutter drum of a field chopper has a central point M and an outer surface identified with reference numeral 1. It is supported at its both sides in a side wall 2 of the machine. A transverse support 3 which is fixed to the frame extends between the side walls 2.

Supporting members 4 are mounted on the transverse support 3 near the side walls 2 and in some cases between them. The supporting members 4 are provided with concave recesses 5 having the shape of circular arcs.

A saddle 6 extends over the whole width of the cutter drum and also outwardly beyond the side walls 2. The saddle 6 is provided on its lower side with convex legs 7 having the shape of a circular arc. The number and position of the legs corresponds to the number and position of the supporting members 4. The legs 7 are provided with a slot 8 and a transverse opening 9 having a center which corresponds to the center of the circle of the recesses 5 and the legs 7.

A screw 10 with an eye is inserted in the slot 8. A pin 11 extends both through the transverse opening 9 and through the head of the screw 10. The screw 10 is screwed in the transverse support 3 with interposition of a plate spring set 12, so that the legs 7 lie in the recesses 5 in a play-free manner, but are still rotatable.

A countercutter rail 13 is fixedly connected with the saddle 6 in several points 14 and 15 by screws. The greater part 17 of a bottom which surrounds the cutter drum is suspended or otherwise mounted on nose-shaped projections 16 of the supporting members 4. A first part 18 of the bottom is formed by a horn-shaped projection 19 of the saddle or is connected with the same in a different manner fixedly or pivotally.

A lever 20 is fixedly connected with the ends of the saddle 6. A hinge connection with a not shown pulling and pressing member is provided on the end of the lever. The hinge connection can be formed for example by a threaded spindle or a piston rod of the hydraulic cylinder-piston unit. The leg of the lever 20 is slotted by a slot 22. A threaded pin 23 which is fixed with the frame extends through the slot 22. A friction disc 24 is fitted on the threaded pin 23. A pressure spring 25 presses the friction disc 24 against the side surfaces of the lever 20. Thereby an adjustable friction brake is formed. It prevents an unintentional displacement of the lever 20.

When the pulling and pressing member is formed by a hydraulic cylinder-piston unit, the pressing of the friction disc 24 can also be performed by a hydraulically controlled element.

It will be understood that each of the elements described above, or two or more together, may also find a useful application in other types of constructions differing from the types described above.

While the invention has been illustrated and described as embodied in a supporting and adjusting device for countercutter rail of a field chopper, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A cutting device of a field chopper, comprising a cutting element with a partially surrounding bottom; a countercutter rail; an adjusting element; and a supporting and adjusting unit including a saddle engaged by said adjusting element and arranged so that the countercutter rail can lie on said saddle, said saddle being fixedly connected with the countercutter rail and being turnable together with the latter about a stationary axis which extends parallel to a rotational axis of the cutting element and is located relative to said countercutter rail so that said saddle together with the countercutter rail can be turned by said adjusting element in a direction which intersects the outer surface of the cutting element and fixed at a distance from the outer surface of the cutting element to adjust a cutting gap, said supporting and adjusting unit including means for turnably supporting said saddle and also a stationary transverse support provided with curved supporting members, said saddle having a curved lower side turnably supported on said supporting members.

2. A device as defined in claim 1, wherein said curved supporting members of said transverse support are concave.

3. A device as defined in claim 1, wherein said supporting members of said transverse support and said lower side of said saddle have the shape of circular arcs.

4. A device as defined in claim 1, wherein said lower side of said saddle is provided with legs.

5. A device as defined in claim 1, wherein said saddle has a transverse opening with a central line which defines a turning axis for said saddle.

6. A device as defined in claim 5, wherein said supporting and adjusting unit also includes an axial pin extending through said transverse opening of said saddle.

7. A device as defined in claim 6, wherein said axial pin is connected with said transverse support so that said curved lower side of said saddle is held against said curved supporting members of said transverse support.

8. A device as defined in claim 7, wherein said supporting and adjusting unit also includes means for connecting said axial pin with said transverse support and including a screw provided with an eye.

9. A device as defined in claim 7, wherein said supporting and adjusting unit also includes an elastic element interposed between said axial pin and said transverse support for dosed adjustment of said curved lower side of said saddle relative to said curved supporting members of said transverse support.

10. A device as claimed in claim 9, wherein said elastic element includes a spring element.

* * * * *